United States Patent Office 2,997,433
Patented Aug. 22, 1961

2,997,433
PREPARATION OF TERTIARY BUTYLATED AROMATIC COMPOUNDS
Thomas D. Nevitt, Valparaiso, Ind., assignor to Standard Oil Company, Chicago, Ill., a corporation of Indiana
No Drawing. Filed Mar. 24, 1959, Ser. No. 801,428
8 Claims. (Cl. 204—162)

This invention relates to the preparation of tertiary-butylated aromatic compounds and more specifically concerns a novel method of preparing a tertiary-butylated aromatic compound by reacting an aromatic reactant with neopentane.

The alkylation of various aromatic compounds with alkylating agents such as isobutene, methyl chloride and the like has long been conducted using conventional Friedel-Crafts or acid type catalysts. Unfortunately, these chemical alkylations invariably produce a certain amount of isomerization. When attempting to prepare alkylates of high purity for use as feedstocks in laboratory mechanism studies, e.g. in tracing the course of catalytic reforming reactions, this isomerization reaction frequently complicates product purification, and hence mechanism study, by forming close-boiling isomers of the desired product. Isomerization of hydrogen atoms is particularly acute when attempting to alkylate aromatic compounds with alkyl-affording groups where either the aromatic compounds or the alkyl-affording groups are deuterated or tritiated; in these cases, the resultant product is a mixture of deuterated or tritiated position isomers.

It has now been discovered in accordance with the invention that aromatic compounds may be alkylated substantially without isomerization to yield a tertiary-butylated aromatic compound by reacting the corresponding aromatic reactant with neopentane in the vapor phase in the presence of ionizing radiation of sufficient intensity to effect substantial reaction. In marked contrast to radiation-induced isoparaffin-olefin alkylation, or even in contrast with the alkylation of aromatic compounds by alkyl-affording compounds other than neopentane, the desired tertiary-butylated aromatic compound is recovered as substantially the only product, except for products of the methane ion which forms as a co-product, and for less than about 10% of secondary butyl aromatic.

The reaction of aromatic compounds with neopentane in accordance with the present invention may be schematically represented as follows:

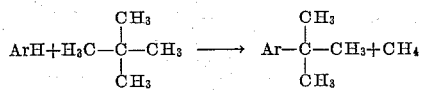

Aromatic compounds which may be reacted according to the above formula range from the simple mononuclear benzenoid aromatics, such as benzene, toluene and xylene, to the substituted polynuclear aromatics such as 1-chloronaphthalene. Other aromatic reactants, such as those listed in National Bureau of Standards circular C 461, 1947, may be used. It appears that the basicity of the aromatic determines, to some extent, the efficiency of radiation, with the G value (t-butyl) for benzene being 0.4, while the G for more-basic toluene is 2.9, and the G for o-xylene is 4.0. Also, it appears that t-butylation occurs more readily in the meta or para, rather than ortho, position relative to existing groups on the aromatic nucleus. The aromatic reactant may have hydrocarbon or non-hydrocarbon substituents thereon, such as alkyl or alkenyl groups or chloro, hydroxy, or nitro groups which are stable under processing conditions.

The inventive reaction may be carried out at any suitable pressure and/or temperature, provided there is a vapor phase maintained in the reaction zone. Pressures as low as about $10^{-5}$ millimeters mercury absolute are of demonstrated effectiveness, as are pressures of about atmospheric and as high as 1,000 p.s.i.g. and higher. The mol ratio of neopentane to aromatic reactant is preferably from about 0.1:1 to 10:1. Conveniently, the reaction is conducted at the vapor pressure of the reaction mixture at the temperature employed. Temperatures of, say, —40° C. to plus 200° C. or higher may be utilized.

It is, however, essential that a vapor phase be maintained. When, for example, neopentane and toluene are reacted in the gas or vapor phase, the G value (molecules of product formed per 100 electron volts of energy absorbed) is on the order of 2.9. However, an analogous reaction conducted in the liquid phase gives a G value of only about 0.02 for tertiary butylation, or less than one one-hundredth of the efficiency achieved in the vapor phase.

Radiation which effects the desired conversion may be any form of radiation which is either directly or indirectly capable of forming ions in the gas phase. Beta particles and gamma rays are especially effective for the instant purpose. As employed herein, throughout the specification and claims, the term "beta" relates to electrons whether derived from nuclear disintegration reactions (beta decay), orbital electron removal (Compton scattering, photoelectric effect), electron generating apparatus (cathode ray tubes, Van de Graaff generators, linear accelerators) or other sources. Likewise, the term "gamma" is taken in its broad sense to denote electromagnetic radiation having a wave length of between about $10^{-8}$ and about $10^{-11}$ centimeters, from whatever source derived. Gamma rays may be obtained from nuclear disintegration (fission, spallation, beta-gamma decay), fusion, or by the interaction of particulate radiation with matter.

Certain radiation sources are particularly economical when employed herein. Spent nuclear reactor fuel elements emit both gamma and beta rays, with gamma energy predominating. Waste fission products, which are the primary fission products and their decay products obtained from nuclear fission processes, are both useful and low cost sources. Material made radioactive by exposure to neutrons in a nuclear reactor, such as Cobalt–60, may be utilized as a high intensity gamma (and low energy beta) source. In large installations, the reactants may be irradiated by the flux in or from a nuclear reactor; if desired, the reactants may constitute all or part of the gaseous moderator or coolant for such reactor. It is preferred that the radiation source be of sufficient strength to supply at least about $10^6$ rep (Roentgen equivalent physical) per hour.

In addition to beta and gamma radiation, X-rays, alpha particles, neutrons, etc., may be employed. Whatever the nature of said ionizing radiation, an energy level in the range of about 0.01 to about 100 mev. (million electron volts), more desirably 0.05–50 mev., is economically most attractive.

Thus, according to the invention, a feedstock containing an aromatic reactant and neopentane is charged to a reaction zone where it is exposed in the vapor phase to ionizing radiation. A suitable dosage for effecting substantial conversion is between about $10^4$ and $10^{10}$ rep (Roentgen equivalent physical) with the dosage controlled in conventional manner by varying the radiation flux and reactants residence time, or both. Irradiation to a dosage of about $10^6$–$10^8$ rep is the preferred practice. Either after radiation processing or, if desired, during irradiation, the tertiary-butylated aromatic compound may be separated in any suitable manner from the reaction mixture. Unconverted reactants may optionally be separated and recycled to the reaction zone, for reprocessing, while the tertiary-butylated aromatic products are sent to storage. Light gases, which are a co-product of the reaction, may be collected and employed as fuel gas, etc.

Illustrative embodiments of the invention are depicted in specific examples presented below. These examples are intended to show particular embodiments and are not to be considered definitive with respect to conditions, procedure, or scope.

EXAMPLE I

In this example, a feedstock consisting of neopentane and toluene was irradiated to produce t-butyl toluene as the primary product.

To an evacuated one liter glass vial, 300 mm. Hg neopentane and 26 mm. Hg of labeled toluene were charged, and the vial was sealed. The toluene had been previously labeled with a ring carbon-14, and contained 2.5% benzene and less than 0.5% ethylbenzene and higher boiling materials. The vial was subjected to gamma radiation from spent uranium fuel slugs at the Argonne National Laboratory at a dosage rate of $10^6$ rep/hour for 100 hours. Radiation was carried out at about 30° C. and a total pressure of 326 millimeters mercury absolute.

After radiation, the vial and contents were cooled in ice, opened, and the mixture analyzed by introducing a large volume of non-labeled aromatics of known composition, fractionally distilling the mixture of reaction products and non-labeled aromatics, and analyzing each cut by liquid-scintillation counting of carbon-14 activity. The percentage of each aromatic compound in the reaction products was calculated from the specific activity of the distillation cuts. Data are shown in the table below:

*Toluene-neopentane reaction products*

| Component: | Micromoles active component |
|---|---|
| Benzene | 2.1 |
| Toluene | 1240.0 |
| Ethylbenzene | 0.9 |
| p-Xylene | 0.9 |
| o-Xylene | 0.9 |
| 1,3,5-trimethylbenzene | 0.4 |
| 1,2,3-trimethylbenzene | 0.9 |
| t-Butyltoluenes | 490.0 |
| Bibenzyl | 0.4 |
|  | 1736.5 |

Careful analysis of the t-butyltoluene indicated that t-butylation occurred about 60% in the meta position and about 40% in the para position, with substantially no ortho substitution. About 90% of the butyl groups were tertiary butyl radicals, and 10% were secondary butyl radicals. A trace of dibutyl toluene was found. Neither any of the other alkylated toluenes nor bibenzyl were detected. A small amount of neopentane decomposition products was found, although there was no evidence of a polymer produced from neopentane. The radiation of neopentane in the absence of aromatic compounds forms substantial quantities of polymeric material, (F. W. Lampe, J. Phys. Chem., 61, 1015, 1957), and with a radical scavenger present, such as iodine, forms methyl iodide as the predominant product (Gevantman, J. Phys. Chem., 56, 569, 1952).

EXAMPLE 2

In this example, neopentane was reacted with fully deuterated toluene-$d_8$ to produce $C_4H_9C_6D_4CD_3$. The irradiation conditions were identical to those employed for Example 1, with the exception of the nature of the aromatic reactant. The product was analyzed by mass spectra technique, and showed that no migration of hydrogen or deuterium atoms occurred. This is in sharp contrast to the tertiary-butylation of toluene $d_8$ with Friedel-Crafts catalysts where isomerization is rampant.

EXAMPLE 3

In this example, toluene-alpha-$d_3$ was tertiary butylated with neopentane to produce $C_4H_9C_7H_4D_3$. The irradiation conditions duplicate those in Example 1. By mass spectrometry, it was established that the gaseous products contained no deuterated paraffins, demonstrating that substitution of a ring hydrogen occurs.

EXAMPLE 4

To compare gas phase radiation with radiation in the liquid phase, toluene was alkylated with neopentane in two experiments. Gas or vapor phase irradiation was conducted in accordance with the procedure of Example 1. Liquid phase radiations were carried out with 10 cc. of reactants in 20 cc. glass vials at a temperature of 0° C. The following data and results were obtained:

|  | Liquid | Gas [2] |
|---|---|---|
| Radiation Dose (ev./ml.×10$^{-21}$) | 7.6 | 9.6 |
| Neopentane (millimoles) | 180 | 21 |
| Toluene (millimoles) | 2.6 | 1.7 |
| Butyl Substitution ($\mu$ moles) | [1] 2±2 | 490±40 |
| G (Butyl Alkylation) | 0.02 | 2.9 |

[1] Corrected for reaction occurring in vapor phase over liquid.
[2] Total pressure 353 mm.

It is especially observed that the G value in the liquid phase was only 0.02, while in the gas phase in accordance with the instant invention it was 2.9.

EXAMPLE 5

Following the procedure of Example 4, benzene was tertiary-butylated with neopentane in the liquid and in the gas phase. Data are shown in the table below:

|  | Liquid | Gas |
|---|---|---|
| Radiation Dose (ev./ml.×10$^{-21}$) | 5.9 | 2.2 |
| Neopentane (millimoles) | 138 | 5.9 |
| Benzene (millimoles) | 3.2 | 0.6 |
| Butyl Substitution ($\mu$ moles) | 2±2 | 16±3 |
| G (Butyl Alkylation) | 0.02 | 0.44 |

EXAMPLE 6

In several tests, various aromatic compounds and alkanes were irradiated substantially under the same conditions as in Example 1. As shown below a significant amount of molecular interaction takes place. The following results were observed:

|  | Aromatic | Alkane | Wt. Alkane/ Wt. Aromatic | Alkylate G | | | |
|---|---|---|---|---|---|---|---|
|  |  |  |  | $CH_3-$ | $C_2H_5$ | $C_3H_7$ | $C_4H_9$ |
| 1 | Benzene | Neopentane | 9.0 | 0.0 | 0.0 | 0.0 | 0.5 |
| 2 | Toluene | do | 9.0 | 0.0 | 0.0 | 0.0 | 2.9 |
| 3 | do | Methane | 3.5 | 0.2 | 0.0 | 0.0 | 0.0 |
| 4 | do | Ethane | 3.8 | 0.0 | 0.7 | 0.0 | 0.0 |
| 5 | do | Propane | 4.4 | 0.0 | 0.4 | 2.5 | 0.0 |
| 6 | do | Cyclopropane | 6.0 | 0.1 | 0.1 | 0.1 | 0.0 |
| 7 | do | Isobutane | 6.0 | 0.0 | 0.1 | 0.9 | 2.2 |
| 8 | do | Butane | 6.0 | 0.0 | 0.0 | 0.4 | 2.5 |
| 9 | do | Neohexane | 8.6 | 0.0 | 0.0 | 0.2 | 0.8 |
| 10 | do | Diisopropyl | 8.2 | 0.0 | 0.0 | 0.5 | 0.1 |
| 11 | do | Triptane | 3.3 | 0.0 | 0.3 | 0.3 | 1.0 |

The above data clearly demonstrates the uniqueness of neopentane as an alkylating agent. Essentially no by-products were formed when using neopentane, in contrast to the almost universal by-product formation which occurred when employing other alkanes.

It has been further discovered that various high surface area solids (surface areas of more than about 10 square meters per gram by low-temperature nitrogen adsorption isotherm method) are effective in increasing further the efficiency of radiation in the present reaction. For example, a cracking catalyst consisting of 25% alumina on silica increased the radiation efficiency (G value)

by a factor of about 10 times. Other solid materials, especially those which are of an acidic nature such as silica, silica-magnesia, or alumina, are likewise suitable.

Irradiation is also suitable for introducing halogen-substituted alkyl groups onto an aromatic ring. For example, perfluoro propane in the ratio of nine volumes per volume of toluene gives essentially complete conversion of toluene to perfluoro propyl toluene polymer (M.W.~410) under irradiation to $1 \times 10^8$ rep. Methyl chloride in the ratio of 14 volumes per volume of toluene gives 70% conversion of toluene to a toluene-methyl chloride polymer and 10% conversion to $\alpha$-xylylchloride under irradiation to $1 \times 10^8$ rep. The halogen substituted analogue of neopentane, t-butyl chloride, in the ratio of 10 volumes per volume of toluene gives t-butyl toluene G=0.4 and high molecular weight toluene-t-butyl chloride compounds —G toluene=1.2. Other halogen substituted alkanes react similarly.

From the foregoing presentation, it is clear that the present invention provides a unique and novel method of tertiary-butylating aromatic compounds without incurring isomerization or hydrogen atom migration between the alkyl group and the ring. The reaction is, in contrast to apparently similar reactions, extremely selective and results in minimal by-production of undesirable products.

I claim:
1. A process for preparing a tertiary-butylated aromatic compound which comprises reacting an aromatic reactant to be tertiary-butylated with a neopentane while both said aromatic reactant and said neopentane are in the vapor phase in the presence of a sufficient dosage between about $10^4$ and $10^{10}$ rep of high energy ionizing radiation to effect substantial conversion of the aromatic reactant to the tertiary-butylated aromatic product and recovering a tertiary butylated aromatic product.

2. Process of claim 1 wherein said aromatic reactant is benzene.

3. Process of claim 1 wherein said aromatic reactant is toluene.

4. Process of claim 1 wherein said aromatic reactant is a deuterated aromatic reactant.

5. Process of claim 1 wherein said neopentane is a deuterated neopentane.

6. Process of claim 1 wherein said radiation is chiefly beta radiation.

7. Process of claim 1 wherein said radiation is chiefly gamma radiation.

8. Process of claim 1 wherein said radiation is effected in the presence of a high surface area solid of an acidic nature.

References Cited in the file of this patent

UNITED STATES PATENTS 2,872,396    Wilson et al. _____ Feb. 3, 1959

FOREIGN PATENTS 1,148,720    France _____ June 24, 1957